US007720437B2

(12) United States Patent
Weller et al.

(10) Patent No.: US 7,720,437 B2
(45) Date of Patent: May 18, 2010

(54) ZERO-ORDER ENERGY SMART ANTENNA AND REPEATER

(75) Inventors: Thomas Weller, Lutz, FL (US); Jeff Frolik, Essex Junction, VT (US)

(73) Assignees: University of South Florida, Tampa, FL (US); University of Vermont, Burlington, VT (US)

( * ) Notice: Subject to any disclaimer, the term of this patent is extended or adjusted under 35 U.S.C. 154(b) by 745 days.

(21) Appl. No.: 11/608,462

(22) Filed: Dec. 8, 2006

(65) Prior Publication Data

US 2007/0132653 A1 Jun. 14, 2007

Related U.S. Application Data

(60) Provisional application No. 60/597,548, filed on Dec. 8, 2005, provisional application No. 60/825,735, filed on Sep. 15, 2006.

(51) Int. Cl.
*H04B 7/185* (2006.01)

(52) U.S. Cl. .................... 455/13.3; 455/13.1; 455/11.1; 455/67.4; 455/562.1; 342/368; 342/403

(58) Field of Classification Search ................ 455/13.3, 455/13.1, 11.1, 67.4, 67.5, 562.1, 575.7; 342/368, 403
See application file for complete search history.

(56) References Cited

U.S. PATENT DOCUMENTS

| | | | | |
|---|---|---|---|---|
| 5,903,549 | A * | 5/1999 | von der Embse et al. | 370/310 |
| 6,023,244 | A * | 2/2000 | Snygg et al. | 343/700 MS |
| 6,233,433 | B1 * | 5/2001 | Norin | 455/67.14 |
| 6,351,499 | B1 | 2/2002 | Paulraj et al. | |
| 6,525,691 | B2 | 2/2003 | Varadan et al. | |
| 7,430,257 | B1 * | 9/2008 | Shattil | 375/347 |
| 2004/0166817 | A1 * | 8/2004 | Mokhtari et al. | 455/91 |
| 2005/0249509 | A1 * | 11/2005 | Nagarajan et al. | 398/198 |
| 2007/0211786 | A1 * | 9/2007 | Shattil | 375/141 |
| 2009/0110033 | A1 * | 4/2009 | Shattil | 375/141 |

* cited by examiner

*Primary Examiner*—Minh D Dao
(74) *Attorney, Agent, or Firm*—Jeremy Spier; Smith & Hopen, P.A.

(57) ABSTRACT

The invention is a new device that will improve the radio link quality for low power wireless devices. An example application is for low power, miniaturized wireless sensor nodes that are statically deployed in a slowly varying environment or that have limited mobility. The device is a reconfigurable antenna that is novel in that it operates with very low (zero-order) energy in contrast to existing system that required both significant computational and DC power.

12 Claims, 1 Drawing Sheet

The Figure
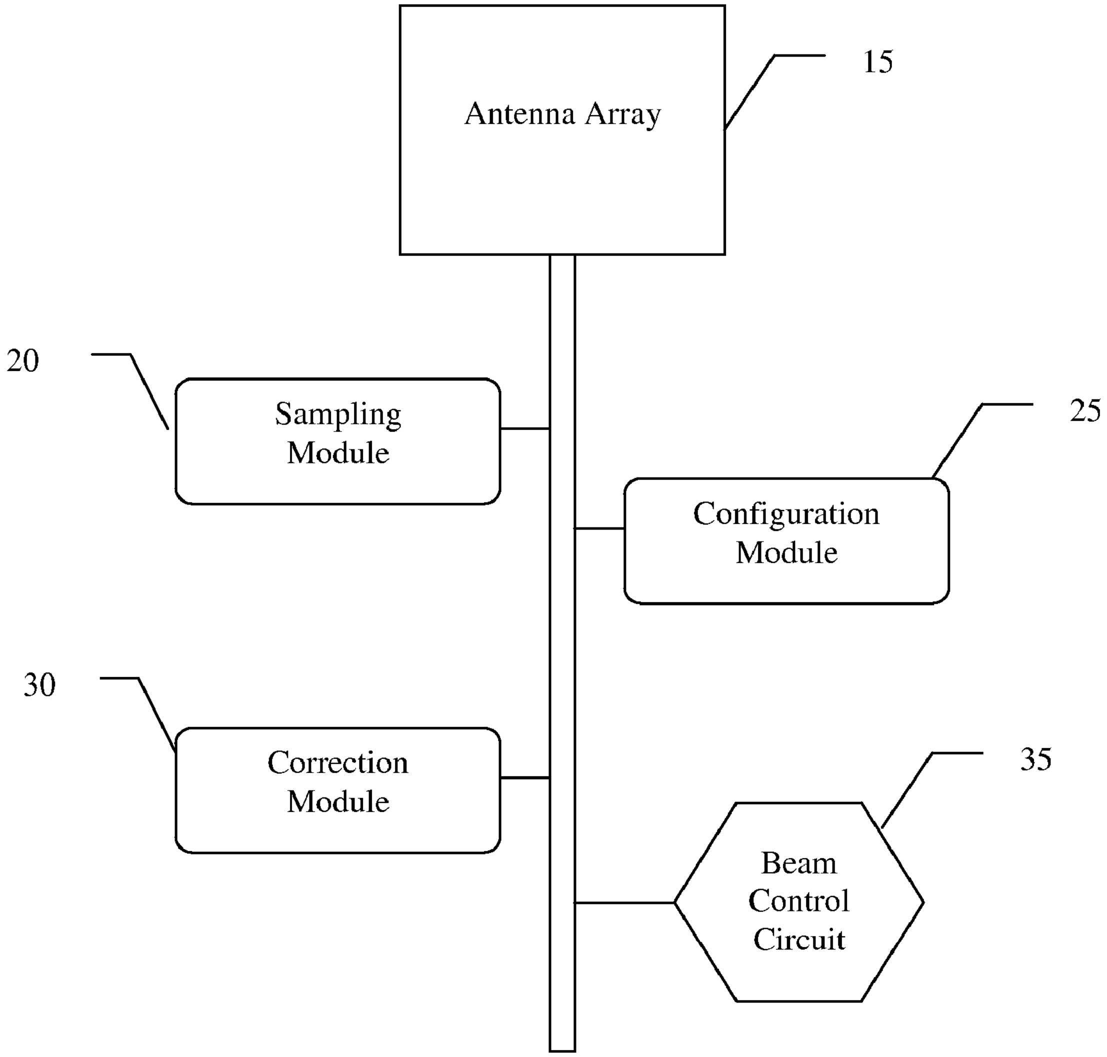

ZERO-ORDER ENERGY SMART ANTENNA AND REPEATER

CROSS REFERENCE TO RELATED APPLICATIONS

This application claims priority to U.S. Provisional Application No. 60/597,548, filed Dec. 8, 2005 and U.S. Provisional Application 60/825,735 filed Oct. 31, 2006, which are incorporated herein by reference.

BACKGROUND OF THE INVENTION

Current technologies for adaptive (i.e. smart) antennas are targeted towards systems that have moderate to large amount of computational and energy resources (e.g., cellular base stations and radar systems). However, wireless sensor networks are constrained in both aspects and as such current smart antenna designs are not appropriate for these systems. Current wireless sensors currently employ antennas that are passive and thus have fixed performance. For example, typical sensor nodes utilize omni-directional designs to ensure signal reception regardless of orientation.

SUMMARY OF INVENTION

The Zero Order Energy (ZOE) antenna is a self-optimizing antenna configuration that will automatically adapt its characteristics to its surroundings using a minimum-energy approach. The antenna is targeted for use with wireless, battery-operated sensor nodes where prime DC power is of major concern.

The invention has advantages in that its radiation properties can be adjusted to improve signal reception and transmission thereby enabling greater communication distances and/or lower transmission power. The key innovation of this invention is the means by which the antenna can be reconfigured. The smart ZOE antenna will consist of an N-element planar array (2-4 elements are probable) configured in an electronically-steered network that utilizes reverse-biased diodes, along with a low-power sampling and beam control circuit. In operation, the network will be configured for optimum signal reception at power-up, and then sampled and corrected as needed at a user- (or base station-) defined time interval. The antenna network consumes ~zero DC energy as the diode current draw is on the order of nA. The low duty cycle of the sampling and control circuit will also ensure minimal DC energy in that regard.

In another embodiment, the invention includes a Zero Order Energy (ZOE) Repeater used to extend the range of wireless communications systems such as commercial and 2-way radio systems. The inventive repeater is a self-optimizing antenna pair that automatically adapts its characteristics to its surroundings using a minimum-energy approach and provides an optimum communications link between individual nodes in a (ad hoc) network.

BRIEF DESCRIPTION OF THE DRAWINGS

For a fuller understanding of the nature and objects of the invention, reference should be made to the following detailed description, taken in connection with the accompanying drawings, in which:

The FIGURE is a block diagram of the inventive smart antenna.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Adaptive Antenna

The present invention is an antenna architecture that is autonomously reconfigured on an as-needed basis depending on temporal channel characteristics, and thereby consumes only minimum DC power (Zero-Order Energy, or ZOE). The term Smart Antenna (also known as adaptive antenna) refers to a system of antenna arrays equipped with signal processing algorithms that are used to identify the direction of arrival (DOA) of the signal, and use it to calculate beamforming vectors, to track and locate the antenna beam on a target. Alternatively, the antenna is replaced with a sensor.

Referring now to the Figure, the ZOE smart antenna 10 consists of an N-element planar array 15 configured in an electronically-steered network that utilizes reverse-biased diodes, along with a low-power sampling module 20 and beam control circuit 35. Generally, the N-element array includes a phased array antenna having a predetermined number "N" antenna elements. In a preferred embodiment the array includes 2-4 elements. In operation, the network is adapted with configuration module 25 which is adapted to establish optimum signal reception at power-up. Correction module 30 adjusts signal reception responsive to a signal from sampling module 20 as needed at a user- (or base station-) defined time interval. The antenna network consumes ~zero DC energy as the diode current draw is on the order of nA. The low duty cycle of the sampling and control circuit will also ensure minimal DC energy in that regard.

The invention employs an adaptive beamformer which includes a signal processing system to transmit or receive signals in different directions without having to mechanically steer the array; the array is electronically steered. An adaptive beam control circuit, as used herein, differs from conventional beamforming systems in their ability to adjust performance to suit differences in its environment. For example, the beamformer control circuit of the present invention has the ability to reduce sensitivity to signals from certain directions to counteract interference by competing sources.

A wireless sensor network (WSN) is a wireless network consisting of spatially distributed autonomous devices using sensors to cooperatively monitor physical or environmental conditions. Two significant system design drivers for wireless sensor networks in poor channel environments are quality of signal reception and conservation of DC power. If DC power, and node size, were not limiting factors the optimum antenna solution would be a real-time, dynamically-reconfigured "smart" antenna network whose radiation properties could be adjusted to maximize signal reception and transmission. In the other extreme, where prime power and size must be conserved, a simple antenna configuration with static properties is the logical choice. In this latter scenario the performance of an individual node is highly dependent on its location within the network, frequency of operation, and time-varying channel characteristics.

The ZOE smart antenna concept provides an intermediate solution with great advantages for network implementations which necessitate a wide variety of sensor locations in a channel with long duty-cycle channel characteristics. For example, a system such as a helicopter air-frame wherein sensor nodes have a wide range of non-line-of-sight geometries to the base-station and channel variations are due to the periodic movement of cargo, passengers, etc. A ZOE-enabled sensor node provides a single solution for any sensor placement, and transfers easily to other installations (e.g. passenger jets). The potential cost savings of this approach are significant, as it would simplify system installations (one sensor—placed anywhere) and minimize or eliminate pre-installation studies in future business development ventures.

Zero-Order Energy Repeater

In another embodiment, the invention includes a Zero-Order Energy (ZOE) Repeater. The repeater is a self-optimizing antenna pair that automatically adapts its characteristics to its surroundings using the minimum-energy approach, discusses above, and provides an optimum communications link between individual nodes in a (ad hoc) network.

A repeater is an electronic device that receives a weak or low-level signal and retransmits it at a higher level or higher power, so that the signal can cover longer distances without degradation.

In telecommunication, the term repeater has the following standardized meanings:

(1) An analog device that amplifies an input signal regardless of its nature (analog or digital); and (2) A digital device that amplifies, reshapes, retimes, or performs a combination of any of these functions on a digital input signal for retransmission.

Repeaters are commonly used to extend the range of wireless communications systems such as commercial and 2-way radio systems. In these systems, repeaters are placed at fixed locations (e.g. antenna towers) and utilize fixed performance directional antennas. The invention disclosed herein is designed for completely different application space; namely, wireless sensor or ad hoc networks. In these systems, the desired coverage area may be dynamic as may be the propagation environment.

A fixed repeater system may not yield optimal performance for the lifetime of the network. The Zero-Order Energy Repeater (ZOE-R) is designed to optimize the configuration of two ZOE antennas based on the signal strength measured at the repeater. The advantage of this approach is that no knowledge of the environment is required a priori. Furthermore, the system can operate in highly dynamic environments where the fading environment is changing and/or the network nodes are mobile.

In one embodiment, the invention includes a device that improves the radio link quality for a network of low power wireless devices. An example application is for low power, miniaturized wireless sensor nodes that are statically deployed in a slowly varying environment or that have limited mobility. The device consists of two reconfigurable antennae having a dynamic configuration which is determined at the repeater itself.

The ZOE repeater differs from traditional repeaters in that it is not dedicated to amplifying the signal, but serves to redirect it. The ZOE repeater has particular utility in its ability to pass a signal between one point, such as one cavity of an airframe, to the next where the signal is optimized both for the receive and transmit directions. General applications include situations where it is necessary to route a signal around an obstacle, or provide another path in a multi-hop network.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. An adaptive antenna apparatus, comprising:

an array antenna including N (N being a natural number) antenna elements configured in an electronically-steered network;

a sampling module;

an adaptive beam control circuit;

said electronically-steered network including reverse-based diodes; and a configuration module, a correction module, and said sampling module consuming about zero DC energy.

2. The antenna of claim 1, further comprising: said configuration module adapted to determine optimum signal reception.

3. The antenna of claim 2, further comprising: said correction module adapted to correct signal reception responsive to a signal from said configuration module.

4. The antenna of claim 3, further comprising: said correction module samples and corrects signal reception at user defined time intervals.

5. The antenna of claim 1, further comprising: a diode current draw on the order of nA.

6. The antenna of claim 1, further comprising: said array antenna being a planar array antenna.

7. A wireless repeater assembly, comprising:

a plurality of antenna including N (N being a natural number) antenna elements configured in an electronically steered network for receiving and transmitting wireless data communications;

a sampling module;

an adaptive beam control circuit;

said electronically-steered network including reverse-based diodes: and a configuration module, a correction module, and said sampling module consuming about zero DC energy.

8. The repeater of claim 7, further comprising: said configuration module adapted to determine optimum signal reception.

9. The repeater of claim 8, further comprising: said correction module adapted to correct signal reception responsive to a signal from the configuration module.

10. The repeater of claim 9, further comprising: said correction module samples and corrects signal reception at user defined time intervals.

11. The repeater of claim 7, further comprising: a diode current draw on the order of nA.

12. The repeater of claim 7, further comprising: said array antenna being a planar array antenna.

* * * * *